United States Patent
Iriti

(10) Patent No.: US 12,528,284 B2
(45) Date of Patent: Jan. 20, 2026

(54) EMBOSSING-LAMINATING DEVICE WITH DOUBLE HEIGHT ENGRAVED ROLLERS

(71) Applicant: SOFIDEL S.P.A., Porcari (IT)

(72) Inventor: Marco Iriti, Porcari (IT)

(73) Assignee: SOFIDEL S.P.A., Porcari (IT)

(*) Notice: Subject to any disclaimer, the term of this patent is extended or adjusted under 35 U.S.C. 154(b) by 142 days.

(21) Appl. No.: 18/307,062

(22) Filed: Apr. 26, 2023

(65) Prior Publication Data

US 2023/0347639 A1     Nov. 2, 2023

(30) Foreign Application Priority Data

Apr. 27, 2022   (IT) .................... 102022000008231

(51) Int. Cl.
| | | |
|---|---|---|
| B32B 38/06 | (2006.01) | |
| B31F 1/07 | (2006.01) | |
| B32B 37/00 | (2006.01) | |
| B32B 37/10 | (2006.01) | |
| B32B 37/12 | (2006.01) | |

(52) U.S. Cl.
CPC .......... *B32B 38/06* (2013.01); *B32B 37/0053* (2013.01); *B32B 37/10* (2013.01); *B32B 37/1284* (2013.01); *B31F 1/07* (2013.01); *Y10T 156/1023* (2015.01)

(58) Field of Classification Search
CPC ...... B32B 38/06; Y10T 156/1023; B31F 1/07; B31F 2201/0733; B31F 2201/0761–0766
See application file for complete search history.

(56) References Cited

U.S. PATENT DOCUMENTS

| | | | |
|---|---|---|---|
| 6,261,666 B1* | 7/2001 | Enderby | B31F 1/07 |
| | | | 428/156 |
| 6,287,676 B1 | 9/2001 | Ruppel et al. | |
| 2005/0257894 A1* | 11/2005 | Biagiotti | B31F 1/07 |
| | | | 156/553 |
| 2010/0021696 A1* | 1/2010 | Hill | B31F 1/07 |
| | | | 156/209 |

FOREIGN PATENT DOCUMENTS

| | | | | |
|---|---|---|---|---|
| EP | 2018959 A2 * | 1/2009 | | B31F 1/07 |
| JP | 2008154599 A * | 7/2008 | | A47K 10/16 |
| WO | 2008069085 A1 | 6/2008 | | |
| WO | 2008071210 A1 | 6/2008 | | |

* cited by examiner

*Primary Examiner* — Carson Gross
(74) *Attorney, Agent, or Firm* — McGlew and Tuttle, P.C.

(57) ABSTRACT

The embossing-laminating device comprises a first embossing roller provided with embossing protrusions defining a first embossing pattern and comprising first embossing protrusions and second embossing protrusions, of a height greater than the first embossing protrusions. The device further comprises a first pressure roller defining, with the first embossing roller, a first embossing nip; wherein a first path for a first ply extends through the first embossing nip. A second embossing roller, provided with embossing protrusions defining a second embossing pattern, coacts with a second pressure roller defining, with the second embossing roller, a second embossing nip. The second embossing pattern of the second embossing roller comprises third embossing protrusions and fourth embossing protrusions, of a height greater than the third embossing protrusions.

20 Claims, 5 Drawing Sheets

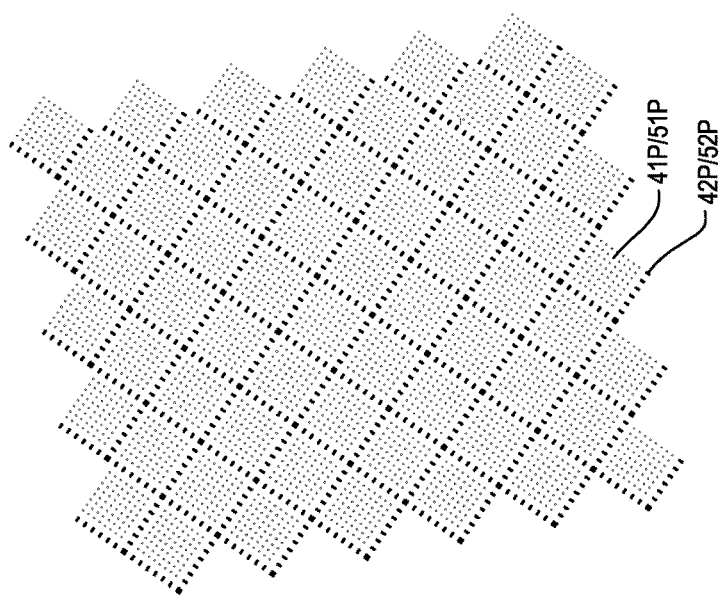
Fig.3
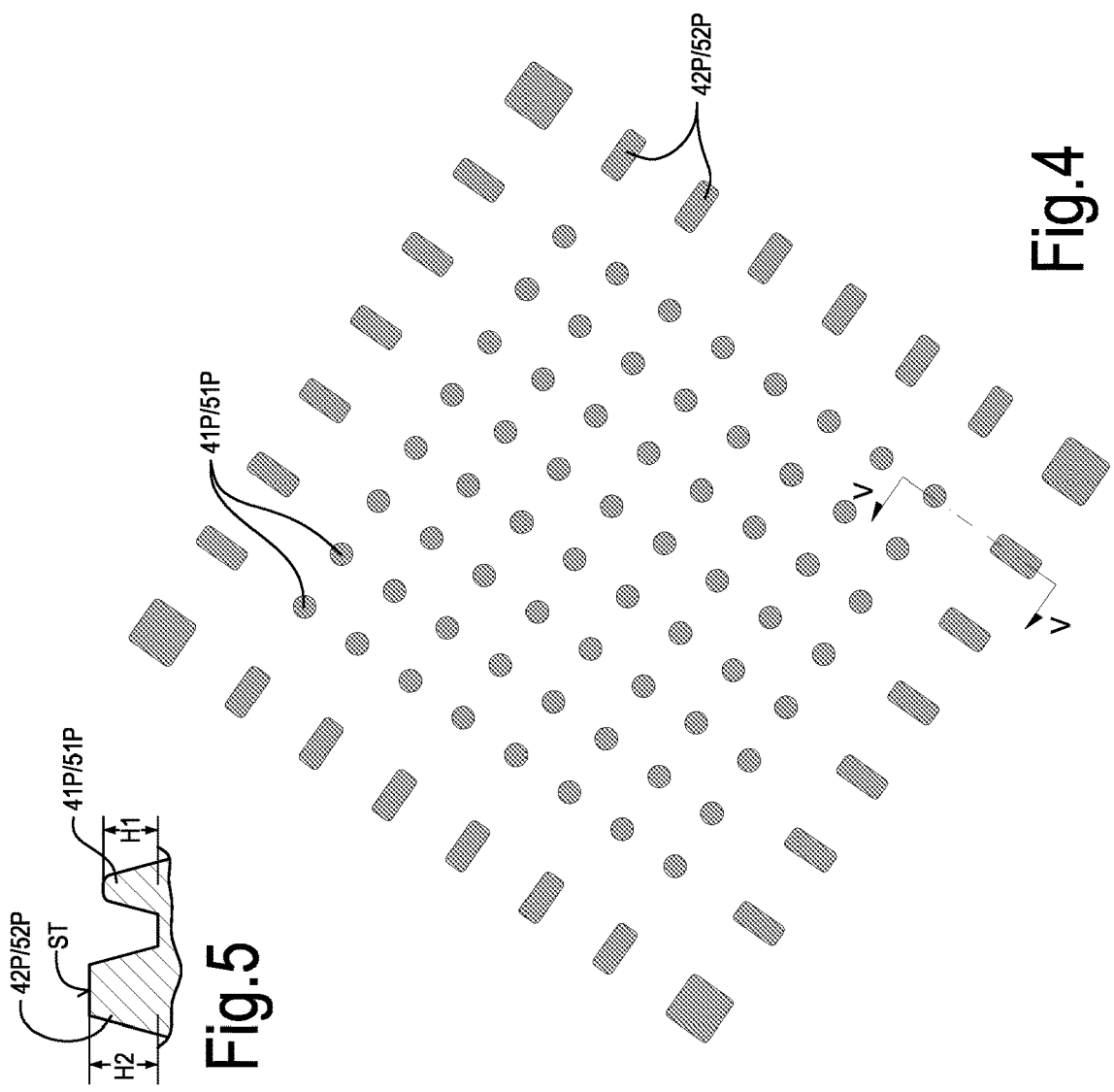
Fig.4
Fig.5

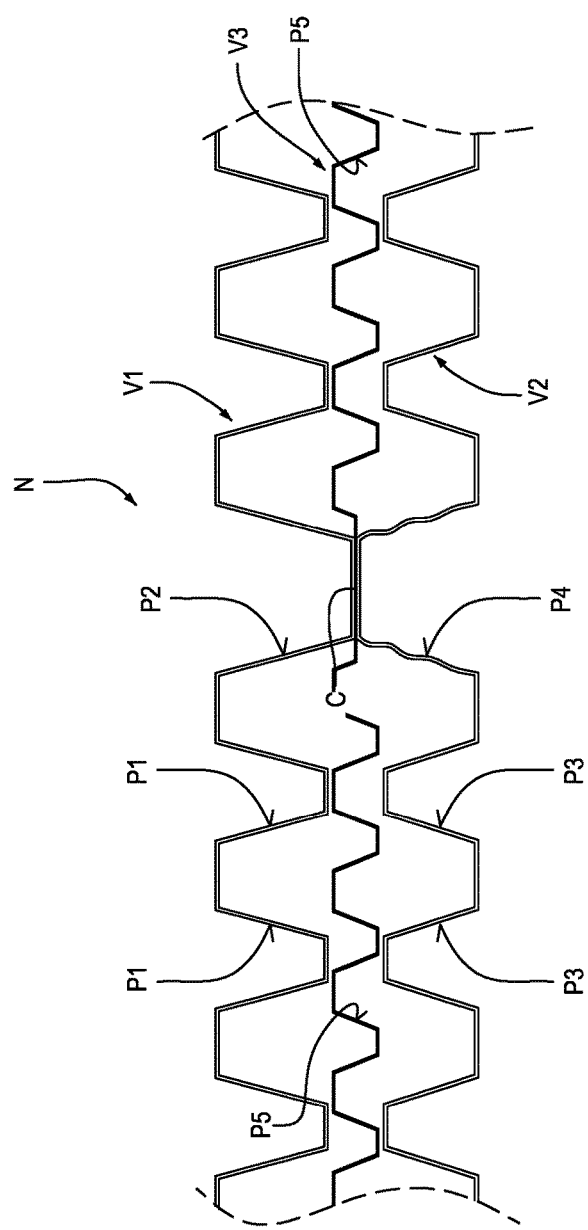
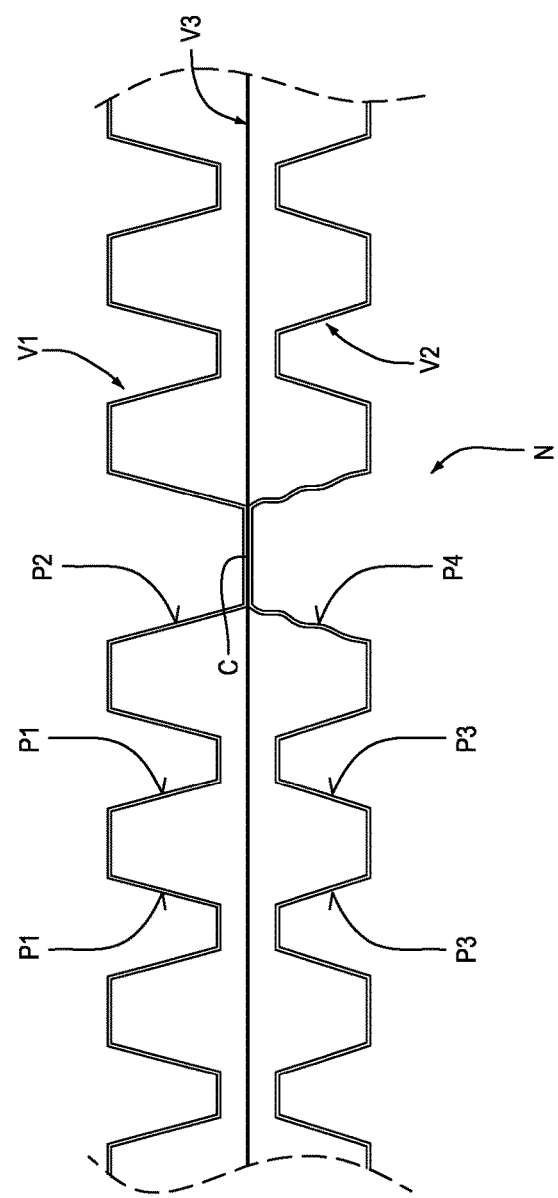

EMBOSSING-LAMINATING DEVICE WITH DOUBLE HEIGHT ENGRAVED ROLLERS

TECHNICAL FIELD

The present invention relates to tissue paper converting technology. In particular, the present invention relates to improvements to devices and methods for embossing tissue paper and for producing a multi-ply web material, comprising at least two plies of embossed tissue paper.

BACKGROUND ART

In the field of tissue paper manufacturing and converting, to obtain products such as rolls of toilet tissue, kitchen towels, napkins and handkerchiefs, facial tissues or interfolded towels, or the like, it is known to unwind a plurality of cellulose fiber plies from one or more parent reels and convert the cellulose plies into a semi-finished product or into a finished product, which comprises one or more plies bonded to one another, for example by gluing or mechanical ply-bonding.

Before bonding the plies, one or both the plies are typically embossed, i.e., subjected to a permanent deformation operation, by feeding the ply through an embossing nip between an embossing roller, having a plurality of embossing protrusions, and a pressure roller. The latter can be smooth and provided with an elastically yielding coating layer, for example made of natural or synthetic rubber. In other cases, the pressure roller is engraved with an engraving pattern complementary to the pattern of the embossing protrusions.

Embossing has several functions. From a technical viewpoint, it can be used to delimit areas for the application of a glue, or other functional fluid, having the purpose of bonding the plies to one another. Moreover, once again from a technical viewpoint, embossing can be used to increase the apparent thickness of the multi-ply material. For example, embossing allows an increase in the final diameter of the rolls obtained by winding of the multi-ply web material, compared to the diameter that would be obtained with unembossed paper, the wound length being equal.

From an aesthetic viewpoint embossing can be used to decorate the multi-ply web material.

Embossing causes permanent deformation of the cellulose fibers that form the embossed plies and in some cases also their at least partial breakage. A limit to the degree of embossing that the ply can be subjected to is determined by the requirement of not compromising mechanical strength and other functional features.

One of the important aspects of embossed multi-ply web material is its softness. It is important that converting operations, in particular embossing, do not compromise the features of softness of the finished product. A further important aspect is the possibility of reaching high apparent thicknesses of the multi-ply web material, i.e., high total thicknesses formed by the distance between the two opposed surfaces of the outer plies bonded to each other.

High thicknesses are obtained with tip-to-tip embossing techniques, which however generate plies that are stiff and not particularly soft, and also tend to compromise the features of mechanical strength of the cellulose material.

EP2018959 discloses an embossing-laminating unit, an embossing method and an embossed multi-ply product. The two plies, each embossed with embossed protrusions of two different heights, are bonded to each other in a tip-to-tip configuration, by pressing the embossing protrusions of a first embossing roller against the embossing protrusions of a second embossing roller. The product obtained is greatly compressed at the protrusions bonded with the tip-to-tip technique, due to the high pressure exerted.

U.S. Pat. No. 6,287,676 discloses an embossing-laminating device with a pair of embossing rollers, which define a laminating nip, in which two plies embossed separately by means of two embossing rollers and respective pressure rollers can be bonded to each other. The lamination pressure is given by the force with which the two embossing rollers are pressed against each other.

It would be desirable to provide embossing devices and methods capable of increasing the apparent thickness, and hence, for example, the final diameter of the rolls obtained by winding of the web material, without subjecting the cellulose plies to an embossing that could compromise the features of softness, absorption capacity and mechanical strength.

SUMMARY OF THE INVENTION

According to an aspect, there is described an embossing-laminating device comprising a first embossing roller provided with embossing protrusions defining a first embossing pattern and comprising first embossing protrusions and second embossing protrusions, of a height greater than the first embossing protrusions. The embossing-laminating device further comprises a first pressure roller defining, with the first embossing roller, a first embossing nip, through which a first path for a first ply extends. A second embossing roller provided with embossing protrusions defining a second embossing pattern coacts with a second pressure roller defining, with the second embossing roller, a second embossing nip. A second path for a second ply extends through the second embossing nip. Advantageously, similarly to the first embossing pattern, the second embossing pattern of the second embossing roller comprises third embossing protrusions and fourth embossing protrusions, of a height greater than the third embossing protrusions.

According to a further aspect, disclosed herein is a multi-ply web cellulose product comprising a first embossed ply with a first embossed pattern, wherein the first embossed pattern comprises first embossed protrusions and second embossed protrusions, wherein the second embossed protrusions have a height greater than the first embossed protrusions. The cellulose product further comprises a second embossed ply with a second embossed pattern, wherein the second embossed pattern comprises third embossed protrusions and fourth embossed protrusions, wherein the fourth embossed protrusions have a height greater than the third embossed protrusions. The first embossed ply is bonded to the second embossed ply at least at some second embossed protrusions and fourth embossed protrusions.

According to yet another aspect, disclosed herein is a method for producing an embossed web material comprising at least a first embossed ply with a first embossing pattern and a second embossed ply with a second embossing pattern, bonded to each other. The method comprises the step of feeding the first ply through a first embossing nip defined between a first embossing roller provided with embossing protrusions, defining a first embossing pattern, and a first pressure roller. The first embossing pattern comprises first embossing protrusions and second embossing protrusions; and the second embossing protrusions have a height greater than the first embossing protrusions. There is further provided a step of embossing the first ply in the first embossing nip. A second ply is fed through a second embossing nip defined between a second embossing roller provided with embossing protrusions, defining a second embossing pattern, and a second pressure roller. The second embossing pattern comprises third embossing protrusions and fourth embossing protrusions; and the fourth embossing protrusions have a height greater than the third embossing protrusions. There are also provided: a step of embossing the second ply in the second embossing nip; and finally a step of bonding the first ply provided with a first embossed pattern generated by the first embossing protrusions and by the second embossing protrusions, and the second embossed ply provided with a second embossed pattern generated by the third embossing protrusions and by the fourth embossing protrusions, to each other, with at least some of the second embossing protrusions at respective fourth embossing protrusions.

Further features and embodiments of the method, of the embossing-laminating device and of the multi-ply web material obtained are described hereunder.

BRIEF DESCRIPTION OF THE DRAWINGS

The invention will be better understood by following the description and the accompanying drawings, which illustrate a non-limiting exemplary embodiment of the invention. More in particular, in the drawing:

FIG. 3 shows a flat view of a surface portion of the first embossing roller and/or of the second embossing roller of the embossing-laminating device of FIG. 1;

FIG. 4 shows an enlargement of a detail of FIG. 3;

FIG. 5 shows a local section along the line V-V of FIG. 4;

FIGS. 8 and 9 show a cross section of a web article obtainable with embossing-laminating assemblies described herein in further embodiments.

DETAILED DESCRIPTION

In the following detailed description reference will be made by way of example to an embossing-laminating device that produces a multi-ply web material, i.e., comprising at least two plies bonded to each other. Each ply can in turn consist of one or more layers of material. However, novel features described herein may also be used in more complex embossing-laminating devices, with a larger number of paths for the plies to be embossed and/or a different number of embossing rollers and pressure rollers.

With regard to the drawings, with initial reference to FIGS. 1 to 6, in FIG. 1 an embossing device (more precisely an embossing-laminating device) 1 has a load-bearing structure 2 with two side panels 3, arranged between which are the embossing rollers, the pressure rollers, the glue application systems and the paths of the cellulose plies as described below.

In the illustrated embodiment, a first embossing roller 4 and a second embossing roller 5 are arranged between the two side panels 3 of the load-bearing structure 2. The first embossing roller 4 is provided with first embossing protrusions 41P and second embossing protrusions 42P, illustrated schematically in FIG. 2A, which shows an enlargement of the area A of FIG. 1. The first embossing protrusions 41P and the second embossing protrusions 42P define a first embossing pattern. As indicated schematically in FIG. 2A, the first protrusions 41P have a height lower than the height of the second protrusions 42P.

Figure 2A:
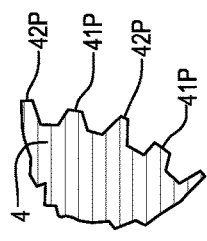
FIGS. 2A and 2B show a schematic enlargement of portions of the embossing rollers of the embossing-laminating device of FIG. 1.
Figure 2B:
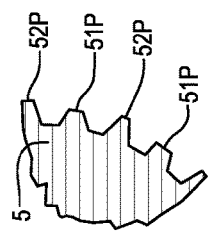

The second embossing roller 5 is provided with third embossing protrusions 51P and fourth protrusions 52P, as indicated schematically in FIG. 2B, which represents a schematic enlargement of the area B. The third and fourth embossing protrusions 51P, 52P define a second embossing pattern. As indicated schematically in FIG. 2B, the third protrusions 51P have a height lower than the height of the fourth protrusions 52P.

Embodiments of the embossing protrusions 41P, 42P, 51P, 52P will be described in more detail below.

The protrusions 41P, 42P and 51P, 52P can be of any shape, for example, they can consist of simple protrusions of truncated cone or truncated pyramid geometrical shape. In other embodiments, the protrusions 41P, 42P and 51P, 52P can be more complex and form more elaborate patterns, formed by sets of protrusions of variable shapes and sizes. For example, the protrusions 41P, 42P and 51P, 52P can have a linear shape and/or have sides with different inclinations and/or different heights or other variants known in the art.

The first embossing roller 4 coacts with a first pressure roller 6. In some embodiments, the pressure roller 6 can be coated with an outer layer 6A made of yielding, preferably elastically yielding, material, for example rubber. The second embossing roller 5 coacts with a second pressure roller 7. In some embodiments, the pressure roller 7 can also be coated with an outer layer 7A made of yielding, in particular elastically yielding, material.

The rotation axes of the two embossing rollers 4, 5 and of the two pressure rollers 6, 7, respectively, are indicated with 4X, 5X, 6X and 7X. These axes are substantially parallel to one another.

The first embossing roller 4 and the first pressure roller 6 form a first embossing nip 8 therebetween, through which a first feed path PV1 of a first ply V1 extends to be embossed by the embossing protrusions 41P, 42P of the first embossing roller 4. When the pressure roller 6 is provided with a yielding outer coating 6A, the embossing protrusions 41P, 42P are pressed against the first pressure roller 6 and penetrate the yielding coating 6A permanently deforming the ply V1. The pattern formed by the first embossing protrusions 41P, 42P generates in the ply V1 a first embossed pattern, consisting of embossed protrusions of the cellulose material, or other kind of material, of which the ply V1 is composed.

The second embossing roller 5 and the second pressure roller 7 form a second embossing nip 9 therebetween, through which a second feed path PV2 of a second ply V2 extends. The second ply V2 is embossed in the same way as the first ply V1, as a result of the protrusions 51P, 52P of the second embossing roller 5 being pressed against the second pressure roller 7. If the latter is provided with an elastically yielding coating 7A, the embossing protrusions 51P, 52P penetrate the yielding coating and cause permanent deformation of the ply V2. The pattern formed by the second embossing protrusions 51P, 52P generates in the ply V2 a second embossed pattern, consisting of embossed protrusions of the cellulose material, or other kind of material, of which the ply V2 is composed.

In order to exert the necessary pressure between pressure rollers 6, 7 and respective embossing rollers 4 and 5 a first actuator 23 can be provided for the pressure roller 6 and a second actuator 24 can be provided for the second pressure roller 7. In practical embodiments, the first pressure roller 6 can be supported by a pair of arms hinged to the side panels 3 and urged by the first actuator 23, while the second pressure roller 7 can be supported by a pair of arms 26 hinged to the side panels 3 and urged by the second actuator 24. In practice, each actuator can be double, and have a respective actuator member on each side panel of the embossing-laminating assembly 1.

The actuators 23, 24 can be hydraulic piston-cylinder actuators or other actuators suitable for the purpose. In practice, two piston-cylinder actuators can thus be provided, one on each side panel, for each of the rollers. Instead of arms hinged to the side panels 3 other movable support members that allow the pressure rollers 6, 7 to move toward and away from the embossing rollers 4, 5 can be provided.

Figure 1:
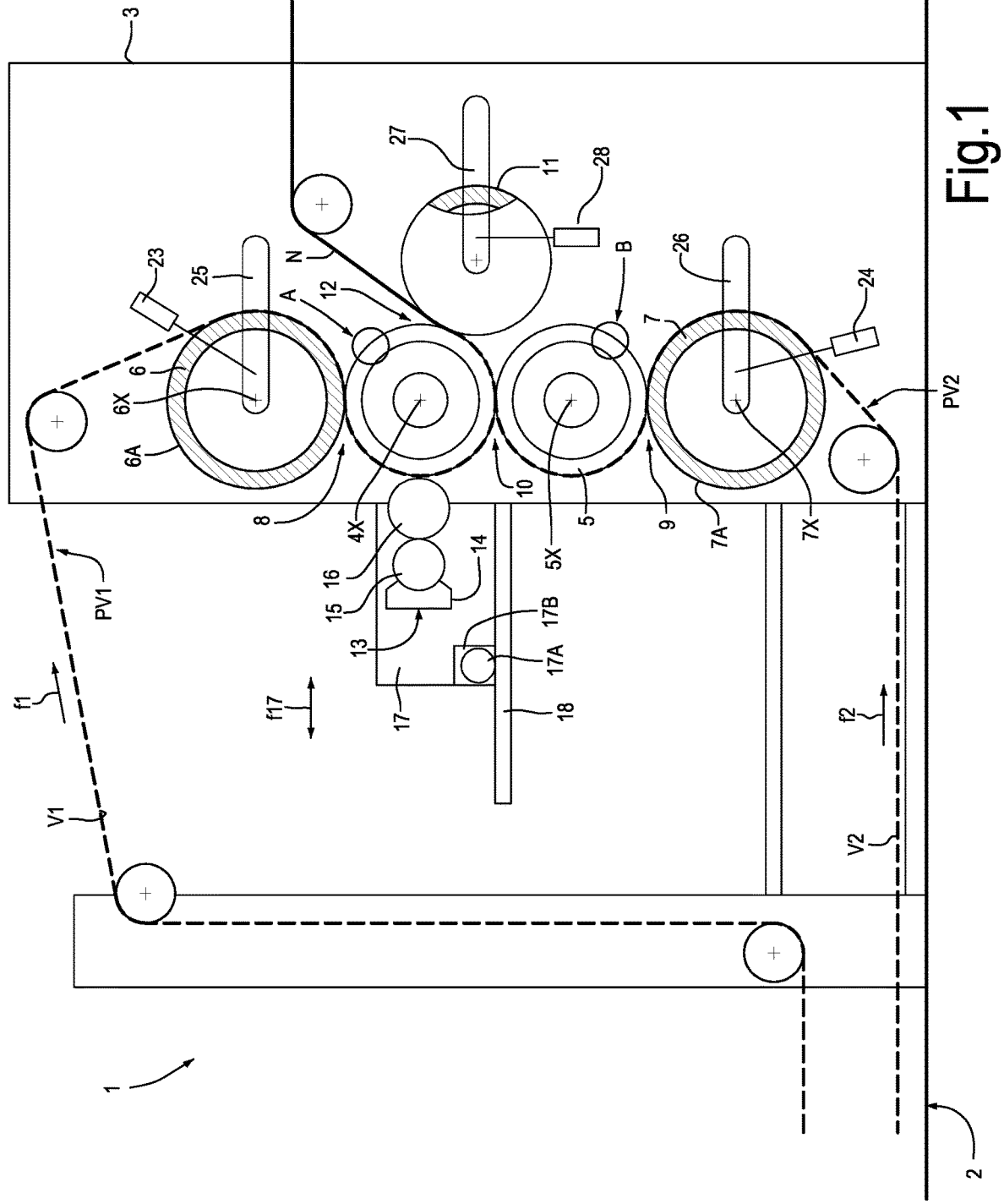
FIG. 1 shows a diagram of an embossing-laminating device.

As shown in FIG. 1, the embossing-laminating device 1 comprises a laminating nip 12. In this way the two plies V1 and V2 can be laminated between the first embossing roller 4 and the laminating roller 11. In the nip 10 defined between the embossing rollers 4, 5, the latter are slightly spaced apart and/or the embossing protrusions 41P, 42P, 51P, 52P of the embossing rollers 4, 5 can be staggered in relation to one another.

In some embodiments, the embossing-laminating device 1 can be configured to operate alternately according to the tip-to-tip technique or according to the nested technique. For this purpose, for example, the embossing rollers 4, 5 can be movable in relation to one another parallel or orthogonal to their axis and the laminating roller can be movable alternatively into an active position and into deactivated position. For this purpose, the laminating roller 11 can be supported by arms 27 hinged to the side panels 3, and can be associated with an actuator 28 that can move the laminating roller 11 away from the first embossing roller 4, or press it (optionally with variable pressure) against the first embossing roller 4.

The embossing-laminating device 1 can comprise a functional fluid applicator 13, the functional fluid being typically glue, associated with the first embossing roller 4.

For example, the functional fluid applicator 13 can comprise a liquid source 14, the liquid being for example a glue, or water optionally with chemical compounds adapted to promote adhesion of the plies through formation of hydrogen bonds or the like, an anilox roller 15, which picks up the liquid from the liquid source 14, and a cliché roller or applicator roller 16, which receives the liquid from the anilox roller 15 and distributes it on portions of the ply V1 embossed and adhering to the first embossing roller 4. In general, the liquid is applied at least at some of the tips of the embossing protrusions provided on the first embossing roller 4, on the portions of the embossed ply V1 when it is still engaged with the surface of the embossing roller 4. The liquid can also be simply water without adhesive substances. If the liquid is water, adhesion of the plies can take place mainly by mechanical pressure.

In some embodiments, the functional fluid applicator assembly 13 is mounted on a slide or carriage 17 that can move according to double arrow f17, for example along guides 18 carried by an element of the fixed structure 2. The movement according to the double arrow f17 can be controlled by a suitable actuator, for example a piston-cylinder actuator, by an electric motor, or by any other suitable actuator. Schematically, FIG. 1 indicates a pinion 17A that meshes with a rack integral with the guides 18 and which is made to rotate under the control of an electric motor 17B, integral with the slide or carriage 17.

When the embossing-laminating device 1 is in operating conditions, the first ply V1 and the second ply V2 advance according to the arrows f1 and f2 along the first feed path PV1 and along the second feed path PV2, toward the embossing rollers 4, 5 and the embossing nips 8, 9, to be embossed separately between the pairs of rollers 4, 6 and 5, 7 to generate therein embossed patterns formed by respective embossed protrusions, in turn generated by the embossing protrusions 41P, 42P and 51P, 52P. The embossed plies V1, V2 are bonded and laminated between the embossing roller 4 and the laminating roller 11 and accordingly form an embossed web material N (in the illustrated example a multi-ply web material) that advances according to arrow fN along an outlet path toward a downstream station, for example a rewinding machine, or an interfolding machine, not shown.

The pressure roller 7 is pressed against the embossing roller 5, while the pressure roller 6 is pressed against the embossing roller 4 to emboss the two plies V2 and V1, and the laminating roller 11 is pressed against the embossing roller 4 to obtain bonding of the plies V1, V2.

The laminating roller 11 can be made of steel, preferably with a smooth outer surface, or coated with a hard material, also in this case with a smooth outer surface. For example, the coating can be made of rubber, generally harder than the yielding material 6A, 7A with which the pressure rollers 6 and 7 are coated.

As mentioned above, the first embossing pattern of the first embossing roller 4 and the second embossing pattern of the second embossing roller 5 are each formed by two series of protrusions of at least two different heights. In some embodiments, the embossing patterns of the two embossing rollers 4, 5 can be the same or symmetrical. Therefore, a single embossing pattern will be described hereunder, which can be used as first embossing pattern on the first embossing roller 4 and as second embossing pattern on the second embossing roller 5. An example of such embossing pattern is shown in FIGS. 3, 4 and 5, which represent a portion of an embossing roller that may be the first embossing roller 4 or the second embossing roller 5, indifferently.

In FIGS. 3, 4 and 5 a first series of protrusions of greater height is shown. These protrusions of greater height can represent the second protrusions 42P or the fourth embossing protrusions 52P, indifferently. In FIGS. 3, 4 and 5 a second series of protrusions of lower height is also shown. These protrusions of lower height can represent the first protrusions 41P or the third embossing protrusions 51P, indifferently.

In FIG. 5, which shows a cross section of a pair of embossing protrusions of different heights, the height of the first embossing protrusions 41P, 51P is indicated with H1 and the height of the second embossing protrusions 42P, 52P is indicated with H2. The height H1 can, for example, range from 1 to 1.5 mm, typically from 1.1 to 1.3 mm. The height H2 can, for example, range from 1.2 to 1.8 mm, preferably from 1.4 to 1.6 mm. For example, the second embossing protrusions 42P and the fourth embossing protrusions 52P can have a height H2 ranging from 120% to 130% of the first embossing protrusions 41P and of the third embossing protrusions 51P, respectively.

In some embodiments, the second embossing protrusions 42P and the fourth embossing protrusions 52P can have a density ranging from 3 to 10 protrusions/cm$^2$, preferably from 4 to 7 protrusions/cm$^2$. In some embodiments, the first embossing protrusions 41P and the third embossing protrusions 51P can have a density ranging from 20 to 100 protrusions/cm², preferably from 40 to 70 protrusions/cm².

In the illustrated embodiment, the second embossing protrusions 42P and the fourth embossing protrusions 52P are arranged according to helical lines intersecting one another, for example, but not necessarily, at 90°.

The embossing patterns engraved on the first embossing roller 4 and on the second embossing roller 5 generate a first embossed pattern on the first ply V1 and a second embossed pattern on the second ply V2, respectively.

Figure 6:
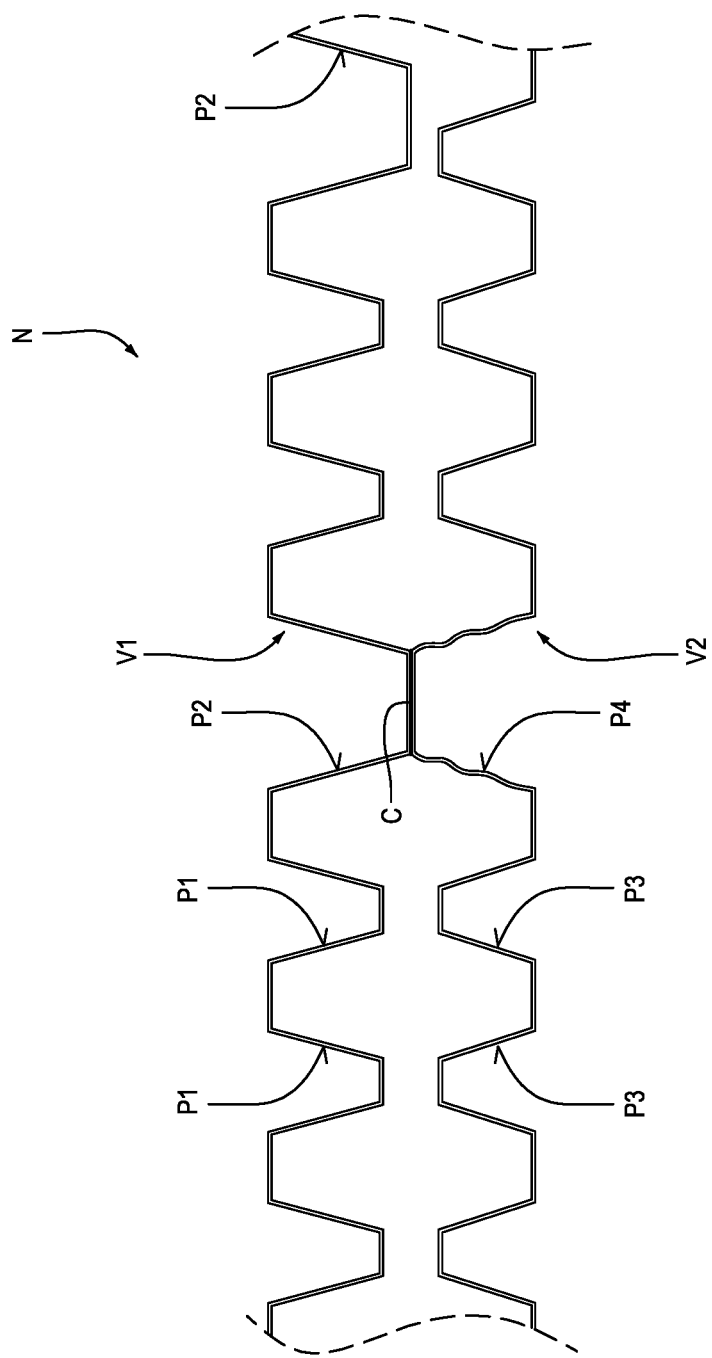
FIG. 6 shows a schematic cross section of a web material obtained with an embossing-laminating device according to embodiments described herein.

FIG. 6 shows a schematic section of a web material N comprising a first ply V1 embossed by the first embossing roller 4 with the first embossing protrusions 41P and the second embossing protrusions 51P. The first ply V1 is bonded, preferably by gluing, to a second ply V2 embossed by the second embossing roller 5 with the third embossing protrusions 51P and the fourth embossing protrusions 52P.

The embossed pattern on the first embossed ply V1 comprises first embossed protrusions P1 formed by the first embossing protrusions 41P, and second embossed protrusions P2 formed by the second embossing protrusions 42P. In a manner corresponding to the protrusions that generated them, the first embossed protrusions P1 are lower than the second embossed protrusions P2. The embossed protrusions generated on the ply V2 by the embossing protrusions 51P and 52P are indicated with P3 and P4. As the embossing protrusions 51P are lower than the embossing protrusions 52P, the embossed protrusions P3 are lower than the protrusions P4.

As the second embossed protrusions P2 are higher than the first embossed protrusions P1, the glue C or other functional fluid applied by the functional fluid applicator 13 is distributed only on the top surfaces of the embossed protrusions P2, when the ply V1 is engaged with the first embossing roller 4.

The dimension and the density of the embossed protrusions P1, P2, P3, P4 correspond to the dimensions and to the density of the embossing protrusions 41P, 42P, 51P, 52P engraved on the embossing rollers 4, 5. Therefore, the numerical values of these parameters of the embossed protrusions P1, P2, P3, P4 correspond to those defined above for the embossing protrusions 41P, 42P, 51P, 52P.

Moreover, at least the embossed protrusions P4 can be slightly compressed, as shown schematically in FIG. 6, as a result of the pressure exerted in the laminating nip 12 by the laminating roller 11. The deformation of the embossed protrusions P4 can be relatively limited and can remain at least partly within the field of elastic deformation, so that the cellulose ply V2 can tend to recover its original thickness reducing the compression sustained by the embossed protrusions P4 when the web material N is delivered from the laminating nip 12.

The arrangement of the embossing protrusions 41P, 42P, 51P, 52P is such that the second ply V2, which is moved away from the second embossing roller 5 and placed on the first embossing roller 4, to pass through the laminating nip 12, enters the laminating nip 12 with some of the fourth embossed protrusions P4 of greater height superimposed on corresponding second protrusions of greater height P2 of the first ply V1. In the laminating nip 12 the first embossed protrusions P1 are still engaged with the first embossing protrusions 41P and the second embossed protrusions P2 are still engaged with the second embossing protrusions 42P. Therefore, the laminating roller 11 presses the fourth embossed protrusions P4 against the second embossed protrusions P2 and the respective second embossing protrusions 42P, causing lamination of the plies V1, V2 and mutual adhesion as a result of the glue C (cf. FIG. 6) applied to the head surfaces of the embossed protrusions P2 of the first ply V1.

The protrusions in mutual contact that are laminated to one another to cause adhesion of the plies V1 and V2 are the embossed protrusions of greater height P2 and P4. This ensures that in the laminating nip 12 the smooth surface of the laminating roller 11 is positioned approximately at the tops of the second embossing protrusions 42P, and more precisely at a distance therefrom equal at least to the sum of the thicknesses of the plies V1 and V2, which may be slightly compressed as a result of the pressure between laminating roller 11 and first embossing roller.

Therefore, the compression whereto the web material N is subjected in the laminating nip 12 is less than that applied to the web material processed with conventional embossing-laminating assemblies, where the second ply V2 is usually provided with an embossed pattern formed by embossing protrusions of the same height and typically very densely arranged embossing protrusions of limited height, forming a micro-embossing. Typically, according to the prior art, the ply V2 is micro-embossed with embossing protrusions with a density of at least 30 protrusions/cm² and preferably much higher, for example from 50 protrusions/cm² to 200 protrusions/cm². This micro-embossing with protrusions of very small height gives rise to a product greatly compressed in the laminating nip with consequent loss of apparent thickness of the end product.

Contrary to this, by using for both the plies V1 and V2 an embossed pattern characterized by a double height, i.e., with embossed protrusions of greater height P2 and P4 in both the plies, and bonding the two plies V1, V2 by lamination at least at some of these embossed protrusions of greater height, the plies are compressed to a lesser extent and elastic recovery of the deformation of the ply V2 can be obtained.

In this way, the multi-ply web material N obtained has a greater apparent thickness than the thickness that can be obtained with conventional methods and conventional embossing-laminating assemblies. Accordingly, the rolls obtained by winding the web material N can have a greater diameter, the length of wound tissue paper being equal, than rolls obtained with conventional techniques.

The features of softness and absorption capacity can also be improved relative to those that can be achieved with conventional products.

According to another aspect, the use of double height embossing protrusions on the second embossing roller makes it possible to obtain better mutual gluing. In fact, as the embossing protrusions 52P are distributed according to a substantially lower density compared with the embossing protrusions 51P, they can have a larger top surface than the embossing protrusions 51P. Therefore, in each gluing area (corresponding to mutually corresponding embossed protrusions P2, P4) the mutual gluing surface between the two plies V1, V2 is greater than that obtained in plies V2 with only single-height embossing with a micro-embossed pattern.

Advantageously, to further improve gluing, the embossing protrusions 42P and 52P can have ground top surfaces ST (cf. FIG. 5) substantially flat in shape, with which an improved effect of lamination and adhesion of the plies V1, V2 is obtained.

In advantageous embodiments, the top surfaces ST of the second embossing protrusions 42P and of the fourth embossing protrusions 52P can have a surface ranging from 1 mm² to 2 mm². The percentage of the surface embossed by the second embossing protrusions 42P and by the fourth embossing protrusions 52P can range from 1.5% to 6%, preferably from 2% to 4% of the total surface of the ply V1 or V2. Therefore, in practice the sum of the top surfaces ST of the embossing protrusions 42P and of the embossing protrusions 52P ranges from 1.5% to 6%, preferably from 2% to 4% of the total surface of the theoretically cylindrical surface that envelops the head surfaces of the embossing protrusions of greater height of the embossing roller.

A further advantage of double height embossing of the ply V2 consists in that the percentage of the ply V2 that undergoes the majority of the deformation through embossing is lower than that in an embossing device in which the embossing roller 5 has a micro-embossing pattern. In fact, in the second embossing nip 9 there will be a penetration into the yielding coating of the second embossing roller 7 mainly of the fourth protrusions 52P, of greater height, while the protrusions of lower height 51P will penetrate the pressure roller 7 to a substantially lesser degree. Accordingly, also due to the fact that the embossing protrusions of greater height 52P are sparser and fewer in number, the percentage of cellulose material deformed in the second ply V2 is lower than that deformed in a conventional embossing-laminating assembly, with second embossing roller 5 engraved with a micro-embossing formed by protrusions of limited height and high density. Typically, with the dimensional values indicated above, there is a reduction of 60 to 65% in the deformed area of the second ply V2 in the case of double height embossing of the ply V2 compared to a micro-embossing with micro-protrusions of uniform height. This preserves the features of elasticity of the paper and consequently, after lamination, the paper tends to recover at least a part of its thickness prior to lamination in the laminating nip 12.

Figure 7:
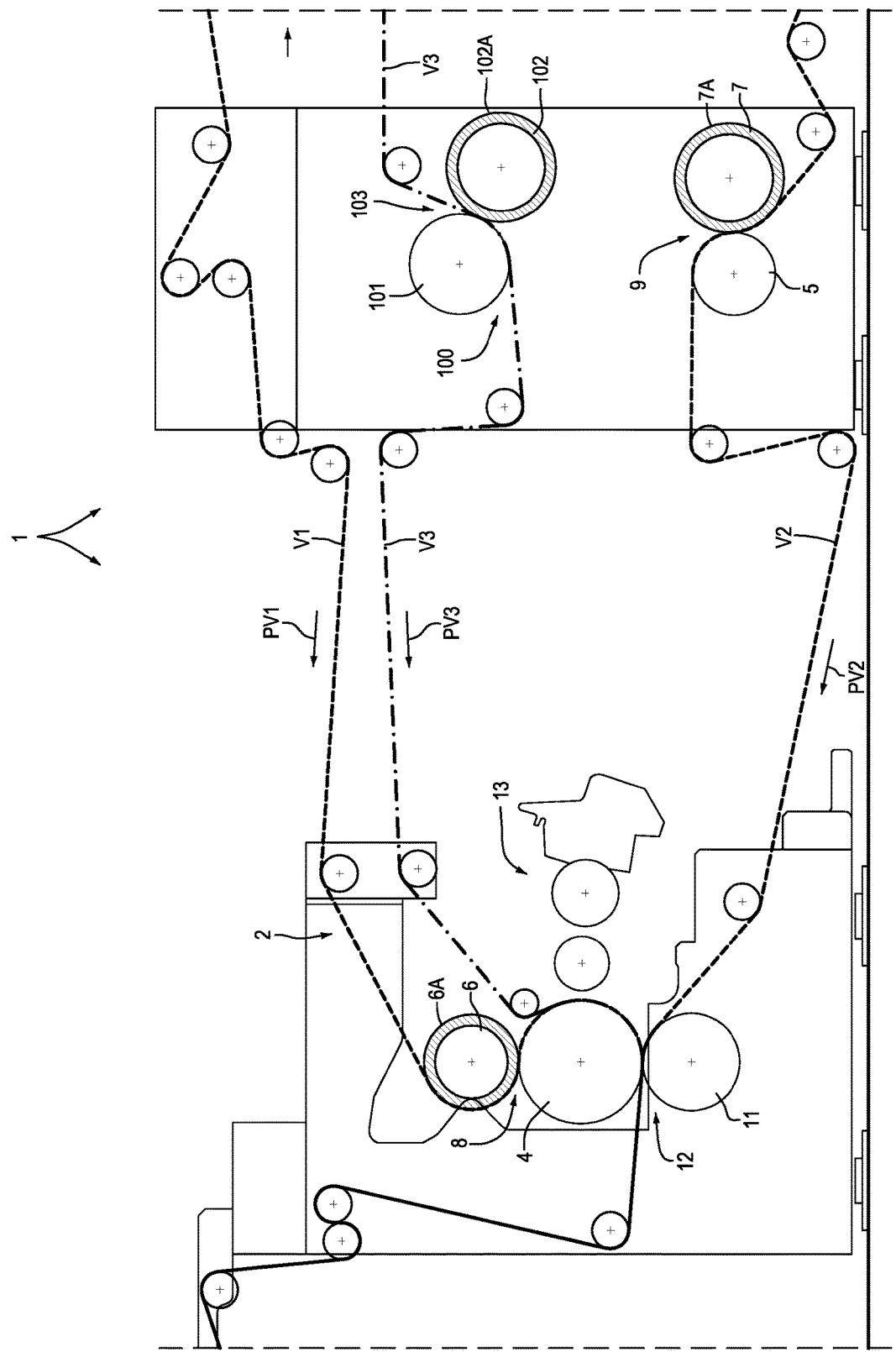
FIG. 7 shows a further embodiment of an embossing-laminating device according to the present description.

FIG. 7 schematically represents a side view of an embossing-laminating assembly according to the invention in a further embodiment. The same numbers indicate parts that are equal, equivalent or comparable to those described above, and referred to briefly hereunder. While in FIG. 1 the embossing-laminating device is of the type commonly called DESL (Double Embossing Single Lamination), in FIG. 7 the embossing-laminating device is of the type commonly called "Deco embossing".

The embossing-laminating device is once again indicated with 1 and has a load-bearing structure 2 with two side panels, between which the embossing rollers, the pressure rollers, the glue application systems and the paths of the cellulose plies as described below are arranged.

In the illustrated embodiment, a first embossing roller 4 and a second embossing roller 5 are arranged between the two side panels of the load-bearing structure 2. Instead of being arranged close to each other, and more precisely one above the other as shown in FIG. 1, in FIG. 7 the first embossing roller 4 and the second embossing roller 5 are spaced apart along a feed path of a cellulose ply V2, described in more detail below. Similarly to what was already described with reference to FIGS. 1 to 5, the first embossing roller 4 is provided with first embossing protrusions 41P and second embossing protrusions 42P, similar to what is illustrated schematically in FIG. 2A. The first embossing protrusions 41P and the second embossing protrusions 42P define a first embossing pattern. Similarly to what was described above, and indicated schematically in FIG. 2A, the first protrusions 41P have a height lower than the height of the second protrusions 42P.

The second embossing roller 5 is provided with third embossing protrusions 51P and fourth protrusions 52P, similarly to what was illustrated schematically in FIG. 2B. The third and fourth embossing protrusions 51P, 52P define a second embossing pattern. As indicated schematically in FIG. 2B, the third protrusions 51P have a height lower than the height of the fourth protrusions 52P.

Also in this embodiment, the embossing protrusions 41P, 42P, 51P, 52P can have the shapes described above.

The first embossing roller 4 coacts with a first pressure roller 6. In some embodiments, the pressure roller 6 can be coated with an outer layer 6A made of yielding, preferably elastically yielding, material, for example rubber. The second embossing roller 5 coacts with a second pressure roller 7. In some embodiments, the pressure roller 7 can also be coated with an outer layer 7A made of yielding, in particular elastically yielding, material.

The first embossing roller 4 and the first pressure roller 6 form a first embossing nip 8 therebetween, through which a first feed path PV1 of a first ply V1 extends to be embossed by the embossing protrusions 41P, 42P of the first embossing roller 4. When the pressure roller 6 is provided with a yielding outer coating 6A, the embossing protrusions 41P, 42P are pressed against the first pressure roller 6 and penetrate the yielding coating 6A permanently deforming the ply V1. The pattern formed by the first embossing protrusions 41P, 42P generates in the ply V1 a first embossed pattern, consisting of embossed protrusions of the cellulose material, or other kind of material, of which the ply V1 is made.

The second embossing roller 5 and the second pressure roller 7 form a second embossing nip 9 therebetween, through which a second feed path PV2 of a second ply V2 extends. The second ply V2 is embossed in the same way as the first ply V1, as a result of the protrusions 51P, 52P of the second embossing roller 5 that are pressed against the second pressure roller 7. If this is provided with an elastically yielding coating 7A, the embossing protrusions 51P, 52P penetrate the yielding coating and cause the permanent deformation of the ply V2. The pattern formed by the second embossing protrusions 51P, 52P generates in the ply V2 a second embossed pattern, consisting of embossed protrusions of the cellulose material, or other kind of material, of which the ply V2 is made.

To exert the necessary pressure between pressure rollers 6, 7 and respective embossing rollers 4 and 5, respective actuators can be provided, not shown in FIG. 7.

As shown in FIG. 7, the embossing-laminating device 1 can comprise a laminating roller 11 pressed against the first embossing roller 4 and forming therewith a laminating nip 12. In this way, the two plies V1 and V2 can be laminated between the first embossing roller 4 and the laminating roller 11.

The embossing-laminating device 1 can comprise a functional fluid applicator 13, the functional fluid typically being glue, combined with the first embossing roller 4, similarly to what was described with reference to FIG. 1 and not further described.

In the embodiment of FIG. 7, the embossing-laminating device 1 comprises a further feed path P3 for a third cellulose ply V3. The third path P3 extends through the gluing nip between the cliché roller of the functional fluid applicator 13 and the first embossing roller 4, and through the laminating nip between the laminating roller 11 and the first embossing roller 4.

Along the third feed path P3 there is also arranged an embossing assembly 100 comprising a third embossing roller 101 coacting with a third pressure roller 102, which can have a coating made of yielding material 102A, for example rubber, or other material with preferably elastic features. A third embossing nip between the pressure roller 102 and the embossing roller 101 is defined with 103. The third cellulose ply V3 is embossed in the embossing nip 103 by the embossing roller 101 and by the pressure roller 102 in a similar manner to that already described with reference to the cellulose plies V1 and V2.

The arrangement is such that the glue, or other functional fluid dispensed by the dispenser 13, is applied to the tops of embossed protrusions on the ply V3 in the nip between the cliché roller 16 and the first embossing roller 4, the ply V3 being placed on the ply V1, which is in turn engaged with the embossing protrusions of the first embossing roller 4.

In some embodiments, the third embossing roller 101 can have an engraving consisting of micro-embossing protrusions, all identical, for example of the type of the embossing protrusions 41P and/or 51P. The dimensions and/or the density of the embossing protrusions of the embossing roller 102 can be identical or in any case of the same order of magnitude as the dimensions and as the density of the embossing protrusions 41P and/or 51P described above.

The multi-ply web material N that is obtained at the outlet of the embossing-laminating assembly 1 of FIG. 7 is shown schematically in the simplified section of FIG. 8. P1 and P2 indicate the embossed protrusions generated on the ply V1 by the embossing protrusions 41P and 42P. P3 and P4 indicate the embossed protrusions generated on the ply V2 by the embossing protrusions 51P and 52P. P5 indicates embossed protrusions generated on the ply V3 by the embossing roller 101 coacting with the pressure roller 102. In the embodiment of the FIG. 8 the embossed protrusions P5 are of smaller dimensions than the other embossed protrusions of the plies V2, V2, but it must be understood that this is only one exemplary embodiment.

In other embodiments, the embossing assembly 100 can be omitted, or deactivated. In this case, if a third ply V3 is fed along the path P3, it remains unembossed. The web material that is obtained is indicated schematically in FIG. 9.

In yet further embodiments, the embossing roller 101 can also be engraved with a series of protrusions of greater height and a series of protrusions of lower height, as illustrated for the embossing rollers 4 and 5. In this case the third ply V3 is embossed, similarly to the plies V1 and V2, with embossed protrusions of greater height and of lower height.

The invention claimed is:

1. A method for producing an embossed web material comprising at least a first ply with a first embossed pattern and a second ply with a second embossed pattern, bonded to each other; wherein the method comprises the following steps:
feeding the first ply through a first embossing nip defined between a first embossing roller provided with embossing protrusions, defining a first embossing pattern, and a first pressure roller; wherein the first embossing pattern comprises first embossing protrusions and second embossing protrusions; and wherein the second embossing protrusions have a height greater than the first embossing protrusions;
embossing the first ply in the first embossing nip and forming on the first ply the first embossed pattern comprising first embossed protrusions formed by the first embossing protrusions of the first embossing roller and second embossed protrusions formed by the second emobssing protrusions of the first embossing roller; the second embossed protrusions having a height greater than the first embossed protrusions;
feeding a second ply through a second embossing nip defined between a second embossing roller provided with embossing protrusions, defining a second embossing pattern, and a second pressure roller; wherein the second embossing pattern comprises third embossing protrusions and fourth embossing protrusions; and wherein the fourth embossing protrusions have a height greater than the third embossing protrusions;
embossing the second ply in the second embossing nip and forming on the second ply the second embossed pattern comprising third embossed protrusions formed by the third embossing protrusions of the second embossing roller, and fourth embossed protrusions formed by the fourth embossing protrusions of the second embossing roller; the fourth embossed protrusions having a height greater than the third embossed protrusions;
applying a functional fluid on the first ply at top areas of the second embossed protrusions of the first ply via an applicator of a functional fluid; wherein the applicator is arranged adjacent to the first embossing roller;
feeding the first embossed ply and the second embossed ply through a laminating nip, defined by the first embossing roller and by a laminating roller, the second embossed ply being moved away from the second embossing roller and placed on the first embossed ply, engaged with the first embossing roller, so that the first embossed ply and the second embossed ply pass through the laminating nip guided on the first embossing roller;
bonding the first embossed ply and the second embossed ply to each other, by pressing at least some of the second embossed protrusions and fourth embossed protrusions against each other by means of the laminating roller and the first embossing roller at second embossing protrusions of the first embossing roller.

2. The method of claim 1, wherein the first embossed ply and the second embossed ply are bonded by gluing.

3. The method of claim 1, wherein the second embossing protrusions of the first embossing roller have a height from 120% to 130% of the height of the first embossing protrusions of the first embossing roller.

4. The method of claim 1, wherein the fourth embossing protrusions of the second embossing roller have a height from 120% to 130% of the height of the third embossing protrusions of the second embossing roller.

5. The method of claim 1, wherein the first embossing protrusions of the first embossing roller have a density ranging from 20 to 100 protrusions/cm$^2$.

6. The method of claim 1, wherein the second embossing protrusions of the first embossing roller have a density ranging from 3 to 10 protrusions/cm$^2$.

7. The method of claim 1, wherein the third embossing protrusions of the second embossing roller have a density ranging from 20 and 100 protrusions/cm$^2$.

8. The method of claim 1, wherein the fourth embossing protrusions of the second embossing roller have a density ranging from 3 to 10 protrusions/cm$^2$.

9. The method of claim 1, wherein the first embossing protrusions of the first embossing roller have a density ranging from 40 to 70 protrusions/cm$^2$.

10. The method of claim 1, wherein the second embossing protrusions of the first embossing roller have a density ranging from 4 to 7 protrusions/cm$^2$.

11. The method of claim 1, wherein the third embossing protrusions of the second embossing roller have a density ranging from 40 to 70 protrusions/cm$^2$.

12. The method of claim 1, wherein the fourth embossing protrusions of the second embossing roller have a density ranging from 4 to 7 protrusions/cm$^2$.

13. A method for producing an embossed web material comprising at least a first ply with a first embossed pattern and a second ply with a second embossed pattern, bonded to each other, the method comprising:
- feeding the first ply through a first embossing nip defined between a first embossing roller provided with embossing protrusions, defining a first embossing pattern, and a first pressure roller, wherein the first embossing pattern comprises first embossing protrusions and second embossing protrusions, the second embossing protrusions having a height greater than the first embossing protrusions;
- embossing the first ply in the first embossing nip and forming on the first ply the first embossed pattern comprising first embossed protrusions formed by the first embossing protrusions of the first embossing roller and second embossed protrusions formed by the second embossing protrusions of the first embossing roller, the second embossed protrusions having a height greater than the first embossed protrusions;
- feeding a second ply through a second embossing nip defined between a second embossing roller provided with embossing protrusions, defining a second embossing pattern, and a second pressure roller, wherein the second embossing pattern comprises third embossing protrusions and fourth embossing protrusions, the fourth embossing protrusions having a height greater than the third embossing protrusions;
- embossing the second ply in the second embossing nip and forming on the second ply the second embossed pattern comprising third embossed protrusions formed by the third embossing protrusions of the second embossing roller, and fourth embossed protrusions formed by the fourth embossing protrusions of the second embossing roller, the fourth embossed protrusions having a height greater than the third embossed protrusions;
- applying a functional fluid on the first ply at top areas of the second embossed protrusions of the first ply via an applicator of a functional fluid, wherein the applicator is arranged adjacent to the first embossing roller;
- feeding the first embossed ply and the second embossed ply through a laminating nip, defined exclusively by the first embossing roller and by a laminating roller, the second embossed ply being moved away from the second embossing roller and placed on the first embossed ply, engaged with the first embossing roller, so that the first embossed ply and the second embossed ply pass through the laminating nip guided on the first embossing roller;
- bonding the first embossed ply and the second embossed ply to each other, by pressing at least some of the second embossed protrusions and fourth embossed protrusions against each other exclusively by the laminating roller and the first embossing roller at second embossing protrusions of the first embossing roller.

14. The method of claim 13, wherein the first embossed ply and the second embossed ply are bonded by gluing, the laminating roller being free of protrusions.

15. The method of claim 13, wherein the second embossing protrusions of the first embossing roller have a height from 120% to 130% of the height of the first embossing protrusions of the first embossing roller.

16. The method of claim 13, wherein the fourth embossing protrusions of the second embossing roller have a height from 120% to 130% of the height of the third embossing protrusions of the second embossing roller.

17. The method of claim 13, wherein the first embossing protrusions of the first embossing roller have a density ranging from 20 to 100 protrusions/cm$^2$.

18. The method of claim 13, wherein the second embossing protrusions of the first embossing roller have a density ranging from 3 to 10 protrusions/cm$^2$.

19. The method of claim 13, wherein the third embossing protrusions of the second embossing roller have a density ranging from 20 and 100 protrusions/cm$^2$.

20. The method of claim 13, wherein the fourth embossing protrusions of the second embossing roller have a density ranging from 3 to 10 protrusions/cm$^2$.

* * * * *